US012770397B2

(12) United States Patent
Kogler et al.

(10) Patent No.: US 12,770,397 B2
(45) Date of Patent: Oct. 20, 2026

(54) SYSTEM AND METHOD FOR GENERATION AND DELIVERING OF VIDEO CLIPS OF SPORT

(71) Applicant: PODPLAY TECHNOLOGIES, INC, Kearny, NJ (US)

(72) Inventors: Maximilian H. Kogler, New York, NY (US); Ilya Rivkin, Astoria, NY (US)

(73) Assignee: PODPLAY TECHNOLOGIES, INC, Kearny, NJ (US)

( * ) Notice: Subject to any disclaimer, the term of this patent is extended or adjusted under 35 U.S.C. 154(b) by 85 days.

(21) Appl. No.: 18/692,933

(22) PCT Filed: Sep. 16, 2022

(86) PCT No.: PCT/US2022/043783

§ 371 (c)(1),
(2) Date: Mar. 18, 2024

(87) PCT Pub. No.: WO2023/043989

PCT Pub. Date: Mar. 23, 2023

(65) Prior Publication Data

US 2025/0046081 A1 Feb. 6, 2025

Related U.S. Application Data

(60) Provisional application No. 63/245,484, filed on Sep. 17, 2021.

(51) Int. Cl.
*G06V 20/40* (2022.01)

(52) U.S. Cl.
CPC .............. *G06V 20/42* (2022.01); *G06V 20/49* (2022.01)

(58) Field of Classification Search
CPC .... G06V 20/42; G06V 20/49; G06Q 30/0621; G06Q 50/205; G09B 19/0038; H04M 1/72412; H04N 7/183
See application file for complete search history.

(56) References Cited

U.S. PATENT DOCUMENTS 6,885,304 B2 * 4/2005 Cliff ........................ H04H 60/32 463/31
8,177,440 B2 * 5/2012 Olsson ..................... H01H 3/20 396/448

(Continued)

FOREIGN PATENT DOCUMENTS

CN 102527022 A 7/2012
CN 103170126 A 6/2013
WO WO-2015031863 A1 * 3/2015 ......... G06Q 30/0252

OTHER PUBLICATIONS

International Search Report dated Dec. 22, 2022 issued in PCT/US2022/043783.

(Continued)

*Primary Examiner* — Philip P. Dang
(74) *Attorney, Agent, or Firm* — Scully, Scott, Murphy & Presser, P.C.

(57) ABSTRACT

A method, a system and a computer program product for delivering video clips of a sport to a user participating in the sport are provided. A camera is used to record and generate a video sequence of the sport participated by the user. A video clip is generated upon activation of a trigger by the user during participating the sport. The video clip includes at least a part of the video sequence and has a clip duration determined based on a timing of the activation of the trigger. The video clip can be delivered to the user upon request and/or payment. The trigger is provided in proximity to the user, such that the user can activate the trigger during participating the sport. The method, system and computer program product can be used to deliver video clips of sports, including table tennis, tennis, badminton, pickleball, Padel tennis, billiards, dancing, and so on.

8 Claims, 13 Drawing Sheets

(56) References Cited

U.S. PATENT DOCUMENTS

| | | | | |
|---|---|---|---|---|
| 9,536,449 | B2 * | 1/2017 | Connor | A61B 5/681 |
| 9,827,483 | B2 * | 11/2017 | Bacus | H04N 9/8211 |
| 10,413,246 | B2 * | 9/2019 | Hochman | A61B 5/11 |
| 11,417,136 | B2 * | 8/2022 | Ran | A63B 69/38 |
| 12,067,677 | B2 * | 8/2024 | Tahara | G06F 3/015 |
| 12,322,416 | B2 * | 6/2025 | Asai | G06T 11/00 |
| 2005/0186987 | A1 * | 8/2005 | Liu | H04M 1/0256<br>455/556.1 |
| 2006/0154220 | A1 | 7/2006 | Toniolo | |
| 2008/0192114 | A1 * | 8/2008 | Pearson | G03B 17/08<br>396/25 |
| 2010/0234183 | A1 | 9/2010 | Mar et al. | |
| 2015/0029341 | A1 | 1/2015 | Sinha | |
| 2016/0071541 | A1 | 3/2016 | Miner | |
| 2016/0249023 | A1 | 8/2016 | Bacus et al. | |
| 2018/0278835 | A1 * | 9/2018 | Meganathan | H04N 23/611 |
| 2019/0132558 | A1 | 5/2019 | Lu | |
| 2019/0197316 | A1 | 6/2019 | Bornfreedom et al. | |
| 2020/0066305 | A1 | 2/2020 | Spence et al. | |
| 2022/0165307 | A1 | 5/2022 | Asai et al. | |

OTHER PUBLICATIONS

Office Action dated Apr. 10, 2026 received in Taiwanese Patent Application No. 111148996.

Notice of Reasons for Refusal dated Jul. 7, 2026 received in Japanese Patent Application No. 2024-515503.

* cited by examiner

Clip Display 701

SYSTEM AND METHOD FOR GENERATION AND DELIVERING OF VIDEO CLIPS OF SPORT

FIELD

This disclosure relates generally to generation and delivering of video clips of a sport and, more particularly, to generation of the video clips upon activation of a trigger by a user participating in the sport and delivering of the video clips to the user upon request.

BACKGROUND

As the development of modern computer technology, the amount of multi-media content that is available to users is increasing dramatically. Particularly, video clips for sports events are becoming available to sports fans and participants. However, users of these videos do not have the option to identify and obtain video clips of interest based on their own preferences, selectively and interactively.

Thus, it is desirable to provide a novel scheme that allows the users to identify and obtain video clips of interest, selectively and interactively.

SUMMARY OF THE DISCLOSURE

In one aspect, the disclosure provides a system for delivering video clips of a sport to at least one user participating in the sport. The system includes a recording device configured to generate a video sequence of the sport participated by the at least one user. The system further includes a hardware processor. The hardware processor is configured to generate a video clip upon activation of a trigger by the at least one user during participating the sport. The video clip includes at least a part of the video sequence and has a clip duration determined based on a timing of the activation of the trigger. The hardware processor is further configured to deliver the video clip to the at least one user upon receiving a request. The trigger is provided in proximity to the at least one user, such that the at least one user can activate the trigger during participating the sport.

In some embodiments, the trigger comprises a physical button and the activation of the trigger is implemented by the at least one user touching the physical button. In some embodiments, the trigger comprises a digital button implemented on a display of a consumer electronic device and the activation of the trigger is implemented by the at least one user touching the digital button. In some embodiments, the trigger comprises a voice activated sensor and the activation of the trigger is implemented by a voice of the at least one user. In some embodiments, the trigger comprises a motion activated sensor and the activation of the trigger is implemented by a motion of the at least one user.

In some embodiments, the recording device includes a camera.

In some embodiments, the clip duration has a length in the range of five seconds to five minutes.

In some embodiments, the sport participated by the at least one user includes table tennis. The video sequence of the sport participated by the at least one user includes one or more table tennis rallies on a table tennis table. The video clip includes at least one of the one or more table tennis rallies.

In some embodiments, the one or more table tennis rallies includes bouncing of a table tennis ball on a surface of the table tennis table greater than two times.

In some embodiments, the trigger is in proximity to the table tennis table.

In some embodiments, the length of the clip duration is determined to be the length of time taken for participating in the at least one of the one or more table tennis rallies.

In some embodiments, the sport participated by the at least one user includes billiards. The video sequence of the sport participated by the at least one user includes one or more hitting of a cue ball on a billiards table. The video clip includes at least one of the one or more hitting of the cue ball.

In some embodiments, the trigger is in proximity to the billiards table.

In some embodiments, the sport participated by the at least one user includes dancing in a studio.

In some embodiments, the trigger is in the studio. In some embodiments, the trigger is on a wall of the studio. In some embodiments, the trigger on the floor of the studio.

In another aspect, the disclosure provides a method for delivering video clips of a sport to at least one user participating in the sport. The method incudes storing a video sequence of the sport participated by the at least one user. The method further incudes upon receiving activation of a trigger by the at least one user during participating in the sport, generating a video clip based on the video sequence. The video clip has a clip duration determined based on a timing for activating the trigger. The clip includes at least a part of the video sequence. The method further incudes upon receiving a request, delivering the video clip to the at least one user. The trigger is provided in proximity to the at least one user, such that the at least one user can activate the trigger during participating in the sport.

In some embodiments, the trigger comprises a physical button and the activation of the trigger is implemented by the at least one user touching the physical button. In some embodiments, the trigger comprises a digital button implemented on a display of a consumer electronic device and the activation of the trigger is implemented by the at least one user touching the digital button. In some embodiments, the trigger comprises a voice activated sensor and the activation of the trigger is implemented by a voice of the at least one user. In some embodiments, the trigger comprises a motion activated sensor and the activation of the trigger is implemented by a motion of the at least one user.

In some embodiments, the clip duration has a length in the range of five seconds to five minutes.

In some embodiments, the sport participated by the at least one user includes table tennis. The video sequence of the sport participated by the at least one user includes one or more table tennis rallies on a table tennis table. The video clip includes at least one of the one or more table tennis rallies.

In some embodiments, the one or more table tennis rallies includes bouncing of a table tennis ball on a surface of the table tennis table greater than two times.

In some embodiments, the trigger is in proximity to the table tennis table.

In some embodiments, the length of the clip duration is determined to be the length of time taken for participating in the at least one of the one or more table tennis rallies.

In some embodiments, the sport participated by the at least one user includes billiards. In some embodiments, the video sequence of the sport participated by the at least one user includes one or more hitting of a cue ball on a billiards table. In some embodiments, the video clip includes at least one of the one or more hitting of the cue ball.

In some embodiments, the trigger is in proximity to the billiards table.

In some embodiments, the sport participated by the at least one user includes dancing in a studio.

In some embodiments, the trigger is in the studio.

In some embodiments, the trigger is on a wall of the studio. In some embodiments, the trigger is on the floor of the studio.

In another aspect, the disclosure provides a system for delivering video clips of a sport to at least one user participating in the sport. The system includes a hardware processor and a memory coupled with the hardware processor. The hardware processor is configured at least to: store a video sequence of the sport participated by the at least one user; upon receiving activation of a trigger by the at least one user during participating in the sport, generate a video clip based on the video sequence; and upon receiving a request, deliver the video clip to the at least one user. The video clip has a clip duration determined based on a timing for activating the trigger. The clip includes at least a part of the video sequence. The trigger is provided in proximity to the at least one user, such that the at least one user can activate the trigger during participating in the sport.

In some embodiments, the trigger comprises a physical button and the activation of the trigger is implemented by the at least one user touching the physical button. In some embodiments, the trigger comprises a digital button implemented on a display of a consumer electronic device and the activation of the trigger is implemented by the at least one user touching the digital button. In some embodiments, the trigger comprises a voice activated sensor and the activation of the trigger is implemented by a voice of the at least one user. In some embodiments, the trigger comprises a motion activated sensor and the activation of the trigger is implemented by a motion of the at least one user.

In some embodiments, the clip duration has a length in the range of five seconds to five minutes.

In some embodiments, the sport participated by the at least one user includes table tennis. The video sequence of the sport participated by the at least one user includes one or more table tennis rallies on a table tennis table. The video clip includes at least one of the one or more table tennis rallies.

In some embodiments, the one or more table tennis rallies includes bouncing of a table tennis ball on a surface of the table tennis table greater than two times.

In some embodiments, the trigger is in proximity to the table tennis table.

In some embodiments, the length of the clip duration is determined to be the length of time taken for participating in the at least one of the one or more table tennis rallies.

In some embodiments, the sport participated by the at least one user includes billiards. The video sequence of the sport participated by the at least one user includes one or more hitting of a cue ball on a billiards table. The video clip includes at least one of the one or more hitting of the cue ball.

In some embodiments, the trigger is in proximity to the billiards table.

In some embodiments, the sport participated by the at least one user includes dancing in a studio.

In some embodiments, the trigger is in the studio. In some embodiments, the trigger is on a wall of the studio.

In another aspect, the disclosure provides a computer program product for delivering video clips of a sport to at least one user participating in the sport. The computer program product includes a computer readable storage medium having program instructions embodied therewith. The program instructions is executable by a processing element of a device to cause the device to: store a video sequence of the sport participated by the at least one user; upon receiving activation of a trigger by the at least one user during participating in the sport, generate a video clip based on the video sequence, wherein the video clip has a clip duration determined based on a timing for activating the trigger, and the clip includes at least a part of the video sequence; and upon receiving a request, deliver the video clip to the at least one user. The trigger is provided in proximity to the at least one user, such that the at least one user can activate the trigger during participating in the sport.

In some embodiments, the trigger comprises a physical button and the activation of the trigger is implemented by the at least one user touching the physical button. In some embodiments, the trigger comprises a digital button implemented on a display of a consumer electronic device and the activation of the trigger is implemented by the at least one user touching the digital button. In some embodiments, the trigger comprises a voice activated sensor and the activation of the trigger is implemented by a voice of the at least one user. In some embodiments, the trigger comprises a motion activated sensor and the activation of the trigger is implemented by a motion of the at least one user.

In some embodiments, the clip duration has a length in the range of five seconds to five minutes.

In some embodiments, the sport participated by the at least one user includes table tennis. The video sequence of the sport participated by the at least one user includes one or more table tennis rallies on a table tennis table. The video clip includes at least one of the one or more table tennis rallies.

In some embodiments, the one or more table tennis rallies include bouncing of a table tennis ball on a surface of the table tennis table greater than two times.

In some embodiments, the trigger is in proximity to the table tennis table.

In some embodiments, the length of the clip duration is determined to be the length of time taken for participating in the at least one of the one or more table tennis rallies.

In some embodiments, the sport participated by the at least one user includes billiards. The video sequence of the sport participated by the at least one user includes one or more hitting of a cue ball on a billiards table. The video clip includes at least one of the one or more hitting of the cue ball.

In some embodiments, the trigger is in proximity to the billiards table.

In some embodiments, the sport participated by the at least one user includes dancing in a studio.

In some embodiments, the trigger is in the studio. In some embodiments, the trigger is on a wall of the studio.

DETAILED DESCRIPTION OF THE DISCLOSURE

In addition, the figures are illustrative rather than limiting, and thus are not necessary drawn in accordance with scales.

Illustrative embodiments of the present disclosure provide a system 100 for delivering video clips of a sport to at least one user participating in the sport. In the following description, the system 100 will be described with reference to one or more users or players participating the sport of table tennis. However, it should be understood that the system 100 is equally or similarly applicable to a variety of sports, including but not limited to, racket sports (including table tennis, badminton, squash, tennis, pickleball, Padel tennis, and so on), tabletop sports (including billiards and so on), dancing in a studio, and so on. By participating in the sports, the players have the potential and ability to change the progress or outcome of the sports. For example, for a racket sport, by participating the sport, the players attempt to score by hitting a ball or shuttle with a racket. For example, for billiards, by participating the sport, the players attempt to score by hitting a cue ball with a stick. For example, for dancing in a studio, by participating the sport, the players dance by themselves or with one or more partners according to a predetermined choreography or spontaneously.

Figure 1:
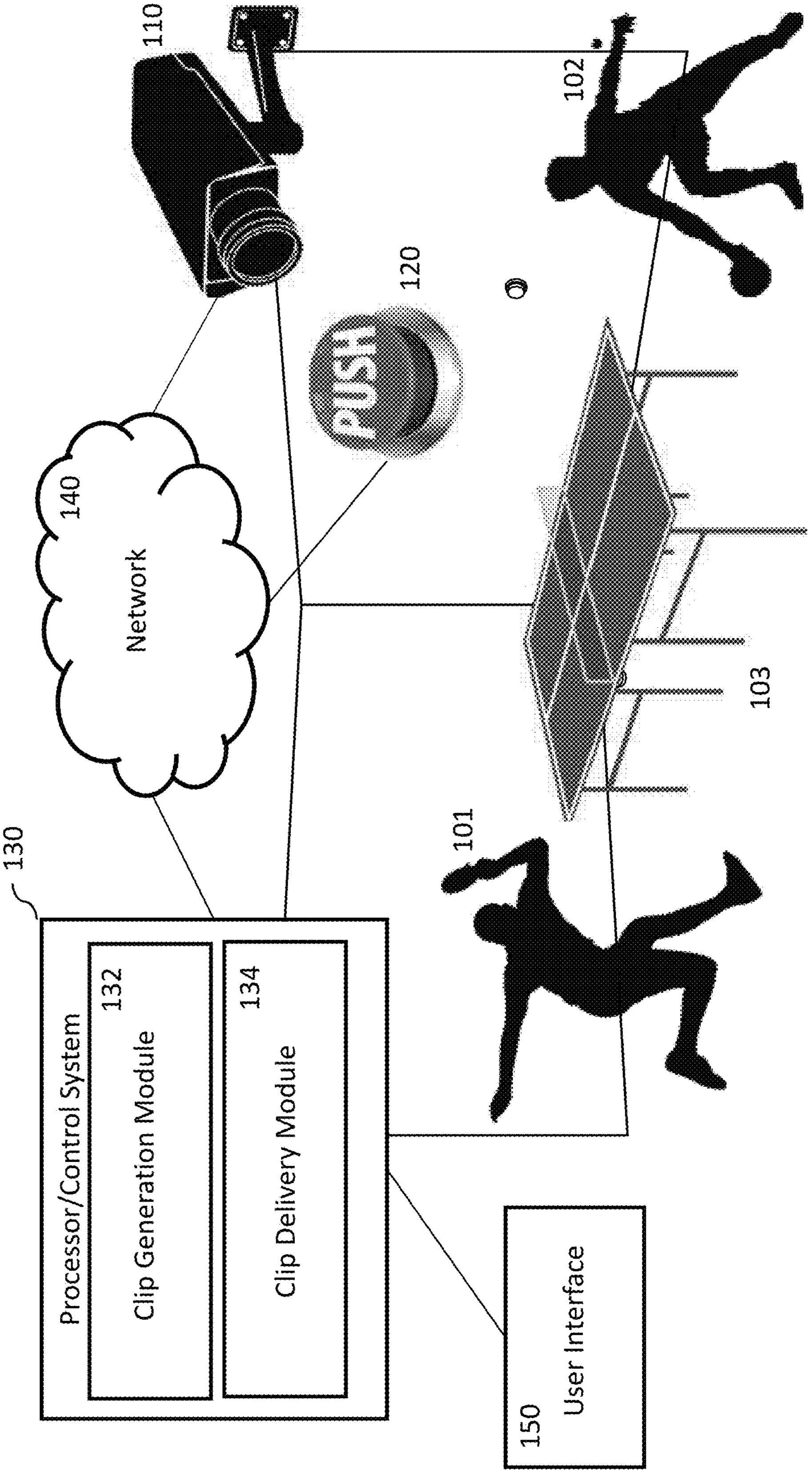
FIG. 1 is a schematic view depicting a system for generating and delivering video clips of a sport to a user participating in the sport, according to one aspect of the disclosure.

Referring to FIG. 1, the system 100 is applied for recording, generating and delivering video clips of a sport, and in this embodiment, video clips of table tennis rallies. In this embodiment, a user 101 and a user 102 play table tennis on a table tennis table 103. It should be understood that there can be more players than two, who participate in playing table tennis on the table, depending on the format of games. For the purpose of brevity and conciseness, the system 100 will be described hereinafter with respect to two users or players 101 and 102, which should not be construed as limiting.

The table tennis table 103 can be any table tennis table suitable for the play of table tennis. In an embodiment, the table tennis table is official regulation size, suitable for tournament play. Such a table is typically nine feet in length, five feet in width and two and a half feet in height having a net across the table tennis table width-wise in accordance with the rules of table tennis. In other embodiments of the system, alternative table sizes can be used. In an embodiment the thickness of the tabletop is twenty-five millimeters. In other embodiments the thickness of the tabletop can be less or more than twenty-five millimeters so long as the table is suitable for table tennis play. As an example, many commonly used table tennis tables for indoor play are nineteen millimeters thick and many commonly used outdoor table tennis tables have a tabletop thickness if twelve or sixteen millimeters, all such tables are suitable for this system. The table tennis table can be any color suitable for table tennis play. In an embodiment, the table is either black, blue or red with white lines delineating the edges and center line.

The system includes a recording device 110 configured to generate one or more video sequences of a sport participated by one or more users/layers. In this embodiment, the recording device 110 is configured to generate one or more video sequences of the users 101 and 102 playing table tennis upon the table tennis table 103.

The recording device 110 can be any camera suitable for recording the table tennis play on the table tennis table 103. The recording device can be a closed-circuit digital camera that includes the capability of recording audio footage in parallel. The recording device 110 can be a camera in a fixed position or can be a movable camera. In either case, the camera is configured to capture videos that include the table tennis table 103 and the users 101 and 102. In some embodiments, the movable camera may adjust its focus or field of view to capture in frame the users as they move during play. In some other embodiments, the recording device is fixed to a wall, surface or a tripod to capture in frame the table tennis table 103 and the users 101 and 102. The recording device 110 has a suitable recording spatial resolution to resolve, at minimum, a table tennis ball and has a recording temporal resolution (frame rate) suitable for resolving the location of bounces of the table tennis ball on the table tennis table 103. An example of a suitable recording device 110 is Alibi ALI-NS1124VR having a spatial resolution of 1920×1080 and a frame rate of at least 25 FPS.

The system 100 further includes a trigger 120 and a processor or control system 130. The recording device 110, the trigger 120 and the processor or control system 130 are in wired or wireless communication with one another. In this embodiment, the recording device 110, the trigger 120 and the processor or control system 130 can be in communication with one another through a network 140. For example, the video sequences recorded by the recording device 110 can be uploaded to a storage, such as, a memory or a cloud, via the network 140 as controlled by the processor or control system 130.

The recording device 110 is configured to record video sequences of the table tennis play by the users 101 and 102, either continuously or upon activation. In an embodiment, the recording device is always capable of recording records consecutive video sequences. As an example, each video sequence can be twenty-four hours. In another embodiment, the recording device 110 is activated by the users 101 and 102 beginning a table tennis session or beginning table tennis play. In this example, a video sequence can be the length of time that covering the entire table tennis session or can be of a length of time lasting from the beginning of table tennis play by the users 101 and 102 until the end of table tennis play by the users 101 and 102. In this example the length of the video sequence can be up to a plurality of hours. The video sequences are uploaded and saved via the network 140 by the processor or control system 130 and can be stored for any amount of time but in one embodiment are stored by the processor or control system 130 for a period of forty-eight hours. In some embodiments, the recording device 110 can also acquire audio footage of the users 101 and 102 playing table tennis on the table tennis table 103.

The processor or control system 130 is configured to implement at least a clip generation module 132 and a clip delivery module 134. The clip generation module 132 functions to generate video clips upon activation of the trigger 120 by either the user 101 or the user 102 during a game or match between the two users. Each video clip is based on at least one of the video sequences generated by the recording device 110 and has a clip duration determined based on a timing of the activation of the trigger 120. The clip delivery module 134 functions to deliver the video clips to the user who activated the trigger 120 upon receiving a request from the user, directly or indirectly.

The video sequences generated by the recording device 110 each includes one or more table tennis rallies on a table tennis table. Each video clip includes at least a part of a correspondent video sequence to include at least one rally. For example, the one or more table tennis rallies can include bouncing of the table tennis ball on the surface of the table tennis table 103 greater than two times. For example, the clip duration can have a length in the range of five seconds to five minutes.

The video clips can be used to for training purposes or entertaining purposes, among others.

For example, most sports require many hours of practice and fine tuning of a player's technique, such as, table tennis. The time spent by a player practicing and improving, the performance or a player and a player's awareness of their technique can be greatly improved both by professional coaching as well as observation of the player's technique in situ. Because players perform differently in practice and in matches, it is beneficial for a player to be able to review their performance during a match as well as in a practice session. Players often play table tennis at table tennis clubs. For the convenience of the player going to such a club, it would be a benefit for a player to be able to receive a replay clip of a rally of interest. This allows the player to review their performance of during the rally of interest and also save or display footage of a particular rally of interest. Currently, table tennis clubs do not offer this function. If a player desires to review their performance, they must record themselves playing at the club either using a camera on a mobile device that they set up or with recording equipment that they bring to the club. In either case, it is difficult for a player to acquire footage with a suitable camera angle and requires planning for the recording as the player must bring and set up the recording equipment before playing. In addition, the footage obtained by the player will include a significant amount of footage that is not of interest and is, as a result, less usable by the player to review their performance. The system 100, according to an embodiment of the disclosure, allows the players to identify and obtain video clips of interest in situ, to improve results of their practice. Players of other sports, including but not limited to, billiards, dancing, tennis, badminton, squash, pickleball, Padel tennis and so on, can also take advantage of the system 100 to improve the results of their practice.

In addition, with the development of modern Internet technology and the popularity of social media based on the Internet technology, it becomes popular for sport participants (for example, players or participants of table tennis, billiards, dancing, tennis, badminton, squash, pickleball, Padel tennis and so on) to obtain and share sports videos, in which they have participated. These videos can be highlights of a game, funny or cool clips for the players to memorializes certain episodes of a game, and so on. These videos can be posted and shared instantly through social medium platforms, as user generated contents, with friends or communities. The system 100, according to an embodiment of the disclosure, allows the players to instantly obtain these video clips of interest and share them on social medium platforms.

The trigger 120 can be in the form of a button. The button can be a physical button that can be touched or pressed by the user 101 or the user 102. The button is provided in proximity to the users 101 and 102, such that the users 101 and 102 activate the button during playing table tennis. For example, button can be provided in proximity to the table tennis table 103.

The trigger 120 can be located in the same facility or room as the table tennis table 103. As shown in FIG. 1, for example, the button can be on a wall of the room where the table tennis table is placed. In an embodiment, the trigger 120 is a physical button located in the same room as the table tennis table 103. The button can have multiple modes that initiate different functions of the system for the recording, generating and delivering of table tennis rally clips. The button can have a single press, double press, long press mode, or other modes. The different trigger modes can control clip duration options, as discussed further below. In some cases, a trigger mode such as long press can be used to "instant order" a clip, a process that requires no further input of by the users 101 and 102 to receive a clip from the clip delivery module 134. In other embodiments, the trigger 120 can be a digital button on a touch screen that is part of a trigger user interface. Alternatively, the trigger can be a sensor that is responsive to a signal the user 101 or the user 102, including but not limited to, an acoustic signal or a gesture. For example, the trigger can be a voice activated sensor and the activation of the trigger is implemented by a voice of a player. For example, the trigger can be a motion activated sensor and the activation of the trigger is implemented by a motion of a player. Such trigger user interface may also include a control of recording initiation by the recording device 110 to generate a video sequence.

The processor or control system 130 can be a computing system that can include one or more personal computers or other devices having a storage component, one or more processing units and other components found in standard computing systems. Such computing devices can include a desktop computer, laptop computer, tablet computer, smart phone, video game console, smart television or set top box, server, workstation, or any other type and form of computing device capable of communicating over a network and executing an application, service, server, daemon, routine, or other executable logic for communicating over the network 140, such as a web browser, mail client, video player, music player, video game, or any other such application. Such computing devices included in the processor or control system 130 may also be suitable for storing, rendering, editing and displaying video and audio footage.

The clip generation module 132 and the clip delivery module 134 may be distributed across multiple computing devices and are coupled to the trigger 120, the recording device 110 and a user interface 150 via the network 140. The modules may include executable code that is executed on one or more computing device that is included in the processor or control system 130. The clip generation module 132 is configured to receive data from the recording device. The video or audio data received by the clip generation module 132 may be time coded or may be time coded by the clip generation module 132. The clip generation module 132 is further configured to flag temporal locations in the time coded data as time stamps. The clip generation module 132 can also read, process, and edit video and audio data, such that upon generation or receipt of a video sequence, it can edit a video sequence to generate a shorter clip included in the video sequence. The clip generation module 132 communicates with the user interface 150 and the other components of the processor or control system 130 via the network and is capable of transferring video and/or audio data to the clip delivery module 134. The clip delivery module 134 is configured to receive clips from the clip generation module and format and send clips to the user 101 or the user 102. In some cases, the clip delivery module 134 is configured to send an email message to the user 101 or the user 102 that includes video clips or hyperlinks to clips that are hosted or stored on a network or an accessible memory. In some cases, the clip delivery module 134 is configured to store video clips that can be accessed via a network by a user 101 via a user interface 150.

The network 140 may be any form of computer network or combination of networks that relay information between computing devices. The network 140 may include the Internet and/or other types of data networks, such as a local area network (LAN), a wide area network (WAN), a cellular network, satellite network, or other types of data networks. The network 140 may also include any number of computing devices (e.g., computer, servers, routers, network switches, etc.) that are configured to receive and/or transmit data within the network 140. The network 140 may further include any number of hardwired and/or wireless connections. A computing device included in the network 140 or the processor or control system 130 may communicate wirelessly (e.g., via WiFi, cellular, radio, etc.) with a transceiver that is hardwired (e.g., via a fiber optic cable, a CAT5 cable, etc.) to other computing devices in the network 140. In some implementations, the network 140 may be a virtual network, such as a virtual network between a plurality of virtual machines executed by a single physical machine, or an abstract network such as an offline transfer of data via physically movable media.

Figure 10:
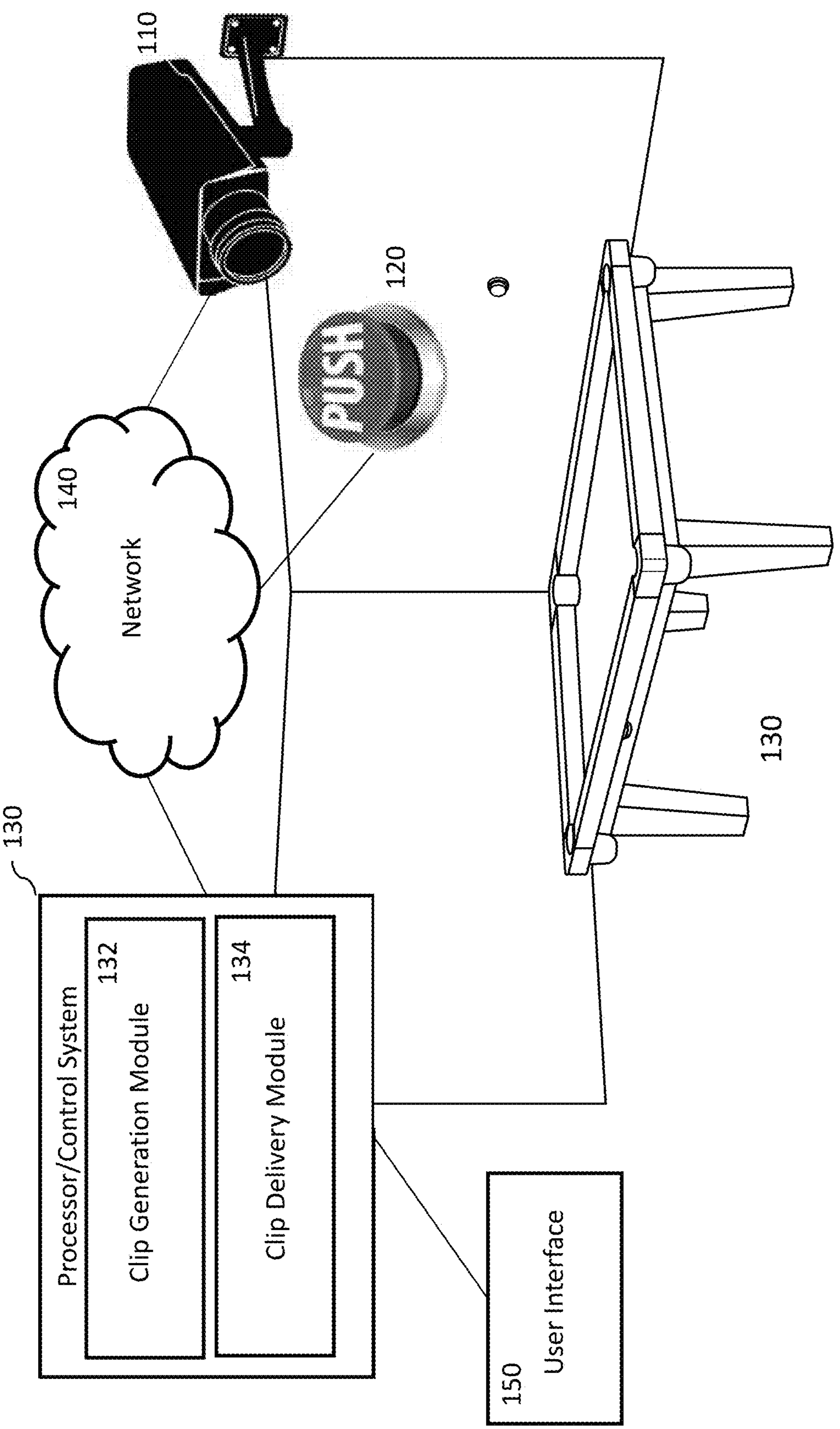
FIG. 10 is a schematic view depicting a system for generating and delivering video clips of a sport to a user participating in the sport, according to another embodiment of the disclosure.

In another embodiment, the sport participated by one or more users is billiards as shown in FIG. 10. The video sequence of the users playing billiards includes one or more hitting of a cue ball on a billiards table by the users. The video clips generated by the clip generation module 132 each includes at least one of the hitting of the cue ball. The button can be provided in proximity to the billiards table, as shown in FIG. 10.

Figure 11:
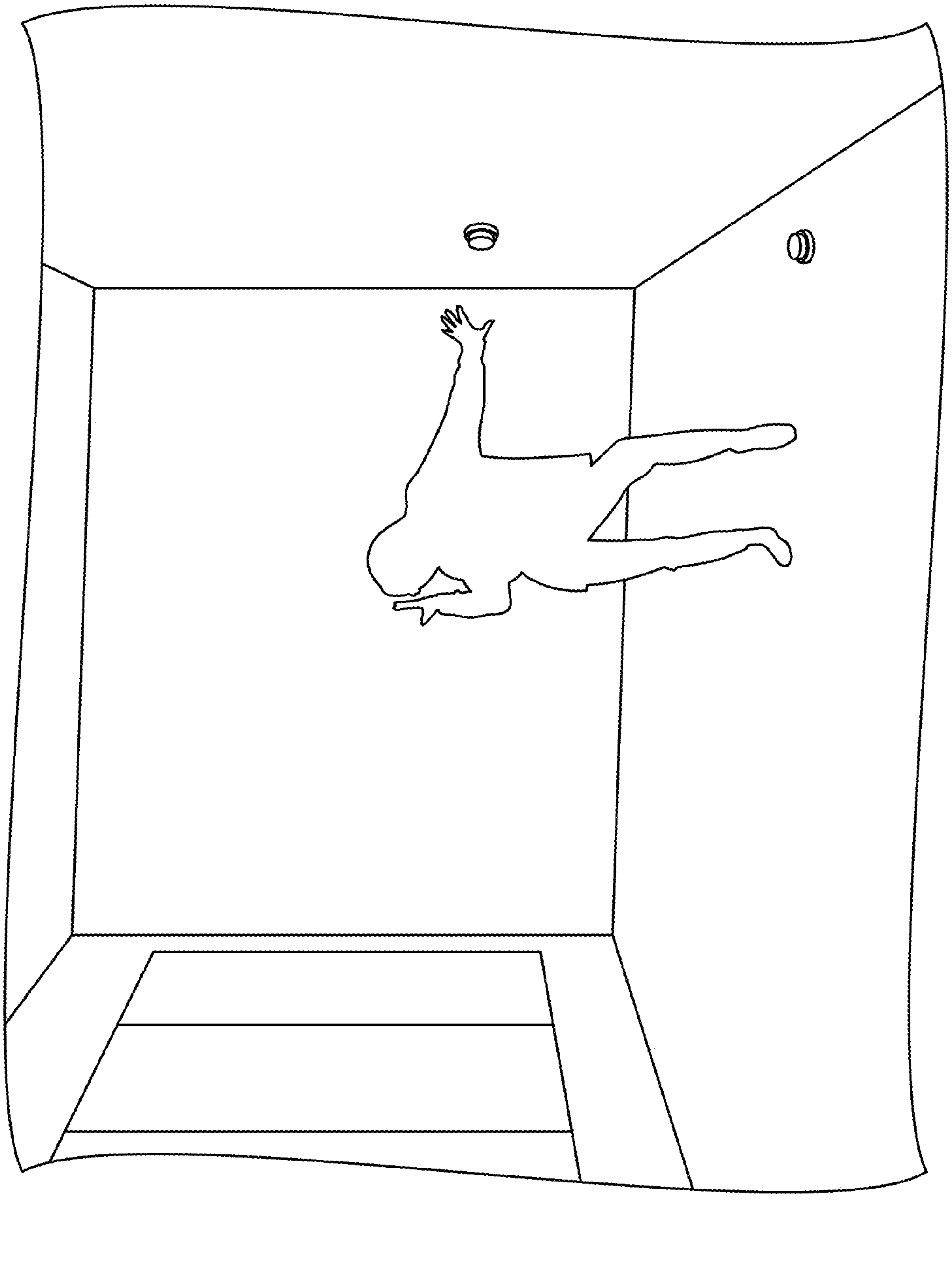
FIG. 11 is a schematic view depicting a system for generating and delivering video clips of a sport to a user participating in the sport, according to yet another embodiment of the disclosure.

In another embodiment, the sport participated by one or more users is dancing in a studio, as shown in FIG. 11. The video sequence of the users participating in dancing includes one or more predetermined movements of the users. The video clips generated by the clip generation module 132 each includes at least one of the predetermined movements of the users. The button can be provided in the studio, such as, a wall of the studio or a floor of the studio, as shown in FIG. 11.

Figure 2:
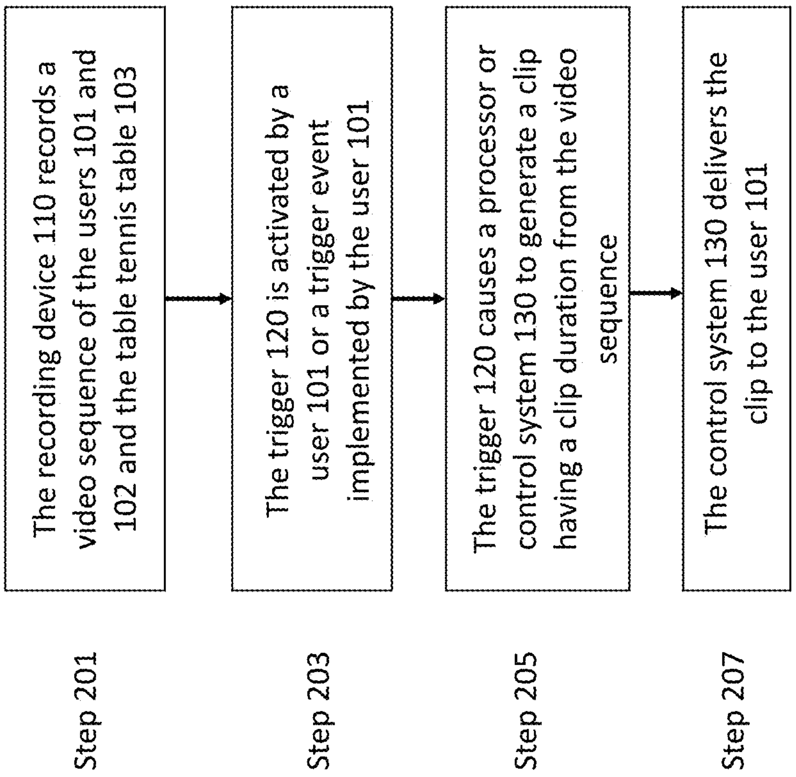
FIG. 2 is a flow chart depicting a method for generating and delivering video clips of a sport to a user participating in the sport, according to another aspect of the disclosure.

FIG. 2 is a flow diagram depicting a method that can be carried out by the system 100 shown in FIG. 1. The recording device 110 records a video sequence of one or more users 101 and 102 and a table tennis table 103 (step 201). The trigger 120 is subsequently activated by the user 101 (as an example). The trigger 120 causes the processor or control system 130 to generate a clip having a clip duration from the video sequence (step 205). The processor or control system 130 subsequently delivers the clip to the user 101 (step 207).

The recording device 110 can record video sequences continuously or can be activated to start recording based on a condition that is satisfied (step 201). As an example, the recording device 110 can start recording a video sequence when the users 101 and 102 start playing table tennis on the table tennis table 103. In such an example, the table tennis table 103 can be located in a facility that requires a check in via a cell phone app, card swipe or other suitable means of checking in to a sports facility. Upon the users 101 and 102 checking in to such a facility, the processor or control system 130 can initiate the recording of a video sequence by the recording device 110. In other embodiments of the disclosure, other conditions may be used by the processor or control system 130 to initiate the recording of video sequences by the recording device 110. For example, other conditions can include the lights in the facility being turned on by the users 101 and 102 or the detection of the users 101 and 102 by a motion detection device that could be coupled to the processor or control system 130 via the network 140. In an embodiment that includes the continuous recording of video sequences by a recording device 110, the video sequences can have any suitable length but in certain embodiments the video sequences can be one hour, two hours or up to forty-eight hours. The video sequences can be discreet sequences that are saved by the processor or control system 130 in a computer memory associated with the processor or control system 130 via the network 140. In some embodiments, the video sequences can be floating or can update periodically or continuously, covering a period of time prior to the current time at any given time. For example, the video sequence can be the video footage acquired by the recording device 110 for the prior forty-eight hours, twenty-four hours or more. In such an embodiment, the video sequence is constantly being updated to include only the previous defined period of time. The video footage prior to that period of time may be saved by the processor or control system 130 as a separate video sequence or may be discarded.

As mentioned above, video sequences can be of different lengths and can be of any length suitable for the system to generate clips. The video sequence can include footage of the users 101 and 102 playing table tennis on the table tennis table 103. In an embodiment, the video sequence includes footage of multiple users 101 playing table tennis on the table tennis table 103. In some other embodiments, the video sequence includes footage of one user 101 playing table tennis on the table tennis table 103 either alone or using a table tennis "robot" or ball machine. Video sequences include time coded data allowing a correlation between the time of recording and the footage acquired. Video footage can also include audio data acquired by the recording device 110. Video sequences can have any suitable spatial and temporal resolution to allow visualization of the table tennis play. For example, the video sequence has a spatial and temporal resolution suitable to visualize a table tennis ball bouncing on the table tennis table 103.

The trigger 120 can be activated by a user or can be activated by a trigger event (step 203). The trigger 120 can be a button located in the same facility as the table tennis table 103. In such an embodiment, the button may have multiple modes. For example, the button may include single press, double press and long press modes whereby users can access different functions of the system (discussed in further detail below). The button can be a physical button or may be included in a touch screen system. In some embodiments, the trigger 120 can be a component of the control system configured to recognize a trigger event. For example, the trigger event can be a specific number of consecutive bounces of a table tennis ball on the table tennis table 103 and table tennis paddles held by the user 101, without bouncing on another surface such as the floor or a wall. As used herein, a "rally" means a series of consecutive bounces of the ball on either the table tennis table 103 or one or more table tennis paddles held by the users 101. In such a case, the control system may analyze a video sequence continually for the presence of a trigger event such as audio or video footage of a rally. Other trigger events can include a specific time of day, a specific time in the video sequence or can be a verbal or somatic action that is performed by a user. For example, the control system can detect a user saying a specific word, such as "replay."

Upon activation of the trigger 120, the processor or control system 130 generates a clip from the video sequence (step 205). In one embodiment, the clip generation module 132, a component of the processor or control system 130, generates a digital time stamp in the video sequence. The digital time stamp can include a digital flag in the time coded data included in the video sequence that correlates with the time that trigger 120 was activated. The clip generation module 132 can generate a clip from the video sequence that starts a defined period of time prior to the time stamp and ends at the time stamp. The defined period of time is the clip duration and can be any length of time that is shorter that the length of the video sequence. For example, the clip duration can be ten, twenty or thirty seconds or can be multiple minutes and can be a number of hours. In some cases, the trigger 120 has multiple modes, as mentioned above, that can correlate to different clip durations. For example, if the trigger 120 is single-pressed by the user 101 the clip duration can be twenty seconds, if the trigger 120 is double-pressed the clip duration can be one minute, and if the trigger 120 is long-pressed the clip duration can be ten minutes. The trigger 120 can be activated multiple times during the course of one video sequence and may result in multiple clips being generated by the clip generation module 132. For example, a twenty second clip generated by the clip generation module 132 in response to the single-press of the trigger 120 and a one-minute clip generated by the clip generation module 132 in response to a double-press of the trigger 120 form the same video sequence. In an embodiment, the clip generation module 132 saves time stamps in response to activation of the trigger 120 and a user interface 150 that is coupled to the processor or control system 130 can provide the user 101 a prompt, identification or notification of the saved time stamp. The user 101 then has the option to confirm or order clips based on the time stamp identified by the user interface 150 to the user 101. Upon confirming or ordering a clip, the clip generation module 132 can generate the clip having a defined clip duration. In some cases, the user 101 can select a clip duration via the user interface 150 upon confirming or ordering a clip.

The clip delivery module 134 included in the processor or control system 130 then delivers clips to one or more users 101 and 102 via the user interface 150. In some embodiments, the user interface may include an email message delivered to a user that includes the clip or provides access to the clip via a hyperlink. In some other embodiments, the user interface 150 is a part of an app that has an interface for viewing and/or saving clips. The user interface can be configured to save clips associated with different users and provide access to clips to different users. The clips can be displayed within a user interface and may be grouped by the user or by time or date or by location. For example, a user interface can include user profiles associated with specific users that include multiple clips associated with such users. In some cases, the ordering or confirming of a clip can be bypassed by a user by a specific mode of the trigger 120 being activated. For example, and as mentioned above, a long-press of the trigger 120 can initiate an "instant order" resulting in an automatic assignment of clip duration by the clip generation module 132 for the time stamp associated with the "instant order."

Figure 3:
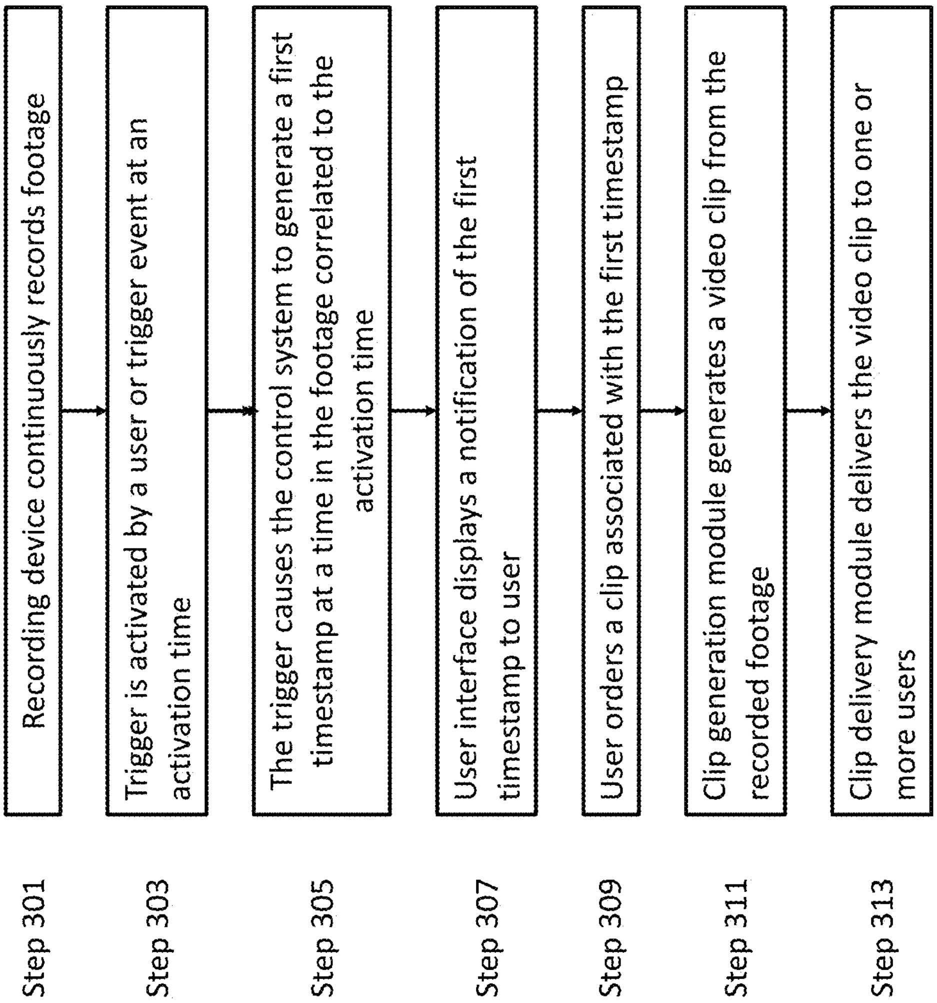
FIG. 3 is a flow chart depicting certain implements of the method show in FIG. 2.

FIG. 3 depicts a flow chart of an example method that can be carried out by the system for the recording, generating and delivering of table tennis rally clips depicted in FIG. 1. In this example, the recording device 110 continuously records footage. As described above, the recording device is continuously recording footage of the table tennis table 103. The footage is continuously being transmitted via the network 140 to the processor or control system 130. The processor or control system 130 generates a video sequence that is updated continuously from the footage. More specifically, the processor or control system 130 stores the latest forty-eight hours of footage as a video sequence. The video sequence is continuously updated to include the latest forty-eight hours and the footage prior to that is not included in the video sequence.

The trigger 120 is activated by the user 101 (as an example) or trigger event at an activation time and the trigger 120 then causes the processor or control system 130 to generate a first time stamp at a time in the footage correlated to the activation time. In an embodiment, the trigger is a physical button that has single-press, double-press and long press modes and is in communication with the processor or control system 130 via the network 140. In one example, a single-press of the button initiates the generation of a twenty second clip, a double-press of the button initiates the generation of a five-minute clip, and a long press initiates an instant order. When the button is pressed, in any mode, the clip generation module 132 generates a time stamp in the time coded video sequence recorded by the recording device 110. The time stamp is assigned to the corresponding time in the video sequence.

The user interface 150 displays a notification of the first time stamp to the user 101. In an embodiment, the user interface is included in an application run on a computing device (including a smart phone) operated by the user 101. The notification can include a separate notification for each time stamp resulting from a different press of the button. If the button was long-pressed the user interface 150 does not require further input by the user 101. The user 101 can then order a clip associated with the time stamp. In some embodiments, the user 101 is prompted by the user interface 150 to enter a desired length of clip. In some such embodiments, the user interface 150 provides preset lengths for the user 101 to choose form, such as twenty seconds, thirty seconds and one minute. When the user 101 enters or selected a desired length of clip, the clip generation module uses this specified length as the clip duration.

The clip generation module 132 generates a video clip from the recorded footage and the clip delivery module 134 delivers the video clip to the user 101 or the user 101 and other relevant users. The clip generation module 132 generates a copy of a portion of the video sequence that ends at the time stamp and includes an amount of time prior to the time stamp that is equal to the clip duration. The clip generation module 132 can do this process for each time stamp that corresponds to a press of the trigger 120. In this non-limiting example, the clip delivery module 134 formats and sends an email message to the user 101 that includes hyperlinks to each clip. The clips are hosted on a network that can be accessed by a computing device operated by the user 101. In this example, the clips may be viewed via computing device or downloaded from the network. Alternatively, or additionally, the clips can be saved on and accessed from the users' online profiles. For example, the clips can be accessed through thumbnails and can be organized, categorized and favored by the users.

In the method shown in FIG. 3, at step 301, the recording device continuously records footage. At step 303, the trigger is activated by a user or a trigger event at an activation time. At step 305, the trigger causes the control system to generate a first time stamp at a time in the footage correlated to the activation time. At step 307, the user interface displays a notification of the first time stamp to the user; and at step 309, the user orders a clip associated with the first time stamp. Alternatively, steps 307-309 can be simplified and streamlined by allowing the user to order the clip without considering the first time stamp. In other words, the first time stamp is not shown on the interface and the user can order the clip associated with the first time stamp by a one-button-press operation. At step 311, the clip generation module generates a video clip from the recorded footage. At step 313, the clip delivery module delivers the video clip to the user.

Figure 4:
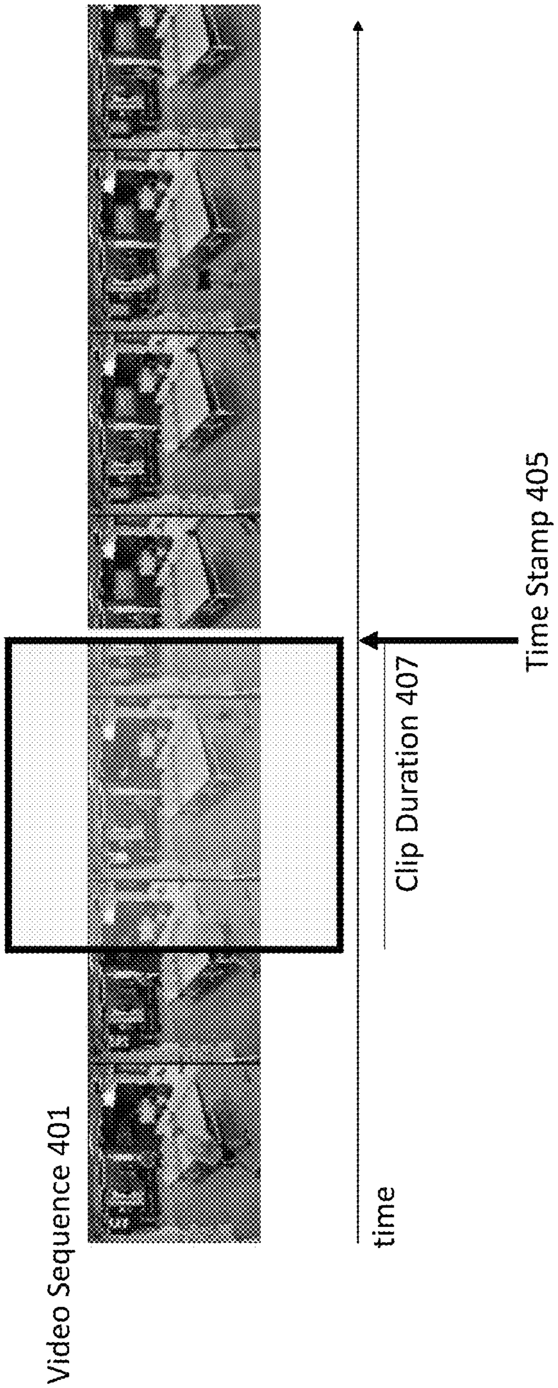
FIG. 4 is a schematic view depicting an exemplary video clip generated by the system shown in FIG. 1.

FIG. 4 is a representation of an example process carried out by the system for the recording, generating and delivering of table tennis rally clips to generate a clip 403 from a video sequence 401. The video sequence 401 is recorded by the recording device 110 and transmitted to the processor or control system 130. The time stamp 405 is generated by the clip generation module 132 in response to the user 101 activating the trigger 120 at a time in the video sequence 401 that corresponds to the time that the user 101 activates the trigger 120111. Based on the specified clip duration 407, the clip 403 has a length that is the clip duration 407 and ends at the time stamp 405.

Figure 5A:
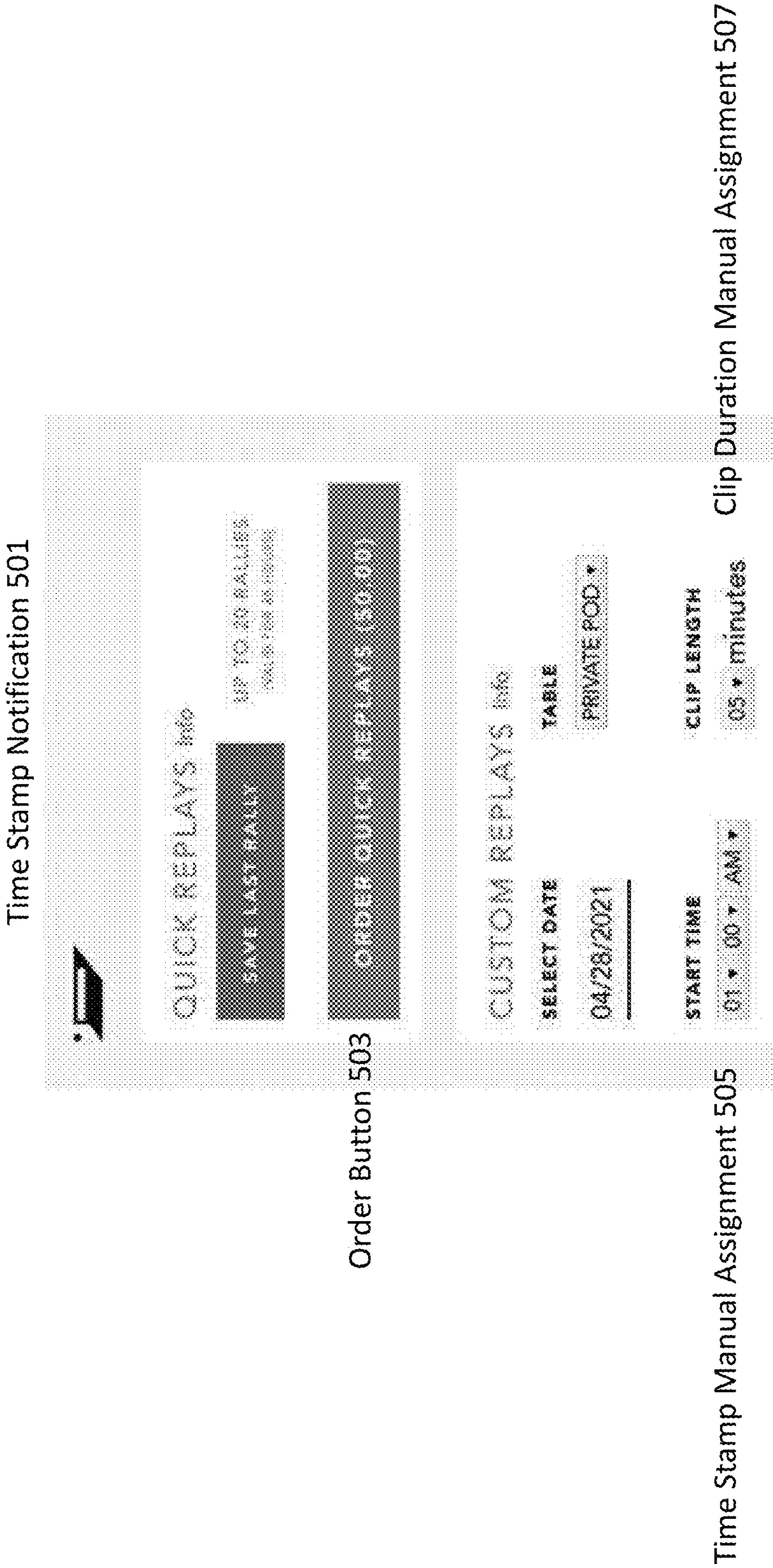
FIG. 5A is a schematic view depicting an exemplary time stamp notification provided to the user via a user interface for delivering the exemplary video clip of FIG. 4.
Figure 5B:
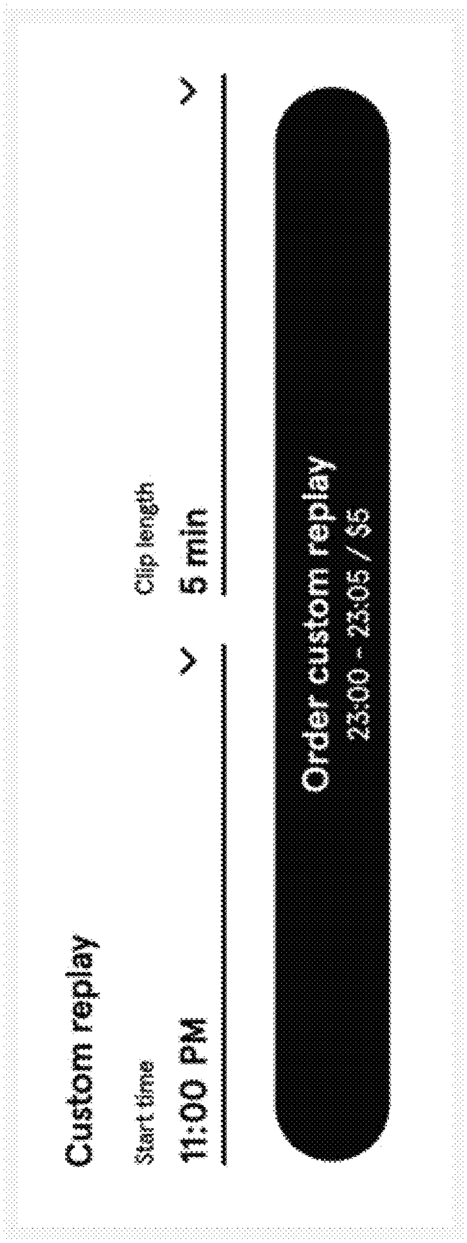
FIG. 5B is a schematic view depicting another exemplary notification provided to the user via a user interface for delivering the exemplary video clip of FIG. 4.

FIG. 5A depicts an example notification 501 of a time stamp provided to the user 101 (as an example) via the user interface 150. The notification 501 includes a mechanism to order clips from time stamps in form of an order button 503. In an embodiment, a user 101 may confirm the order of the clip by toggling the order button 503. Upon toggling the order button 503, the clip generation module 132 generates a clip that ends at the time associated with the time stamp. The user interface 150 also includes user 101 controlled mechanism for manually assigning a time stamp 505 and manually assigning clip duration 507. Upon receiving an input of time stamp time and clip duration from a user 101 via the user interface 150, the clip generation module 132 generates a clip 403 from the video sequence 401. FIG. 5B depicts another exemplary interface for the user to order a custom replay clip in a more streamlined and efficient manner. In this example, the user does not need to manually select a date and a table. Instead, the information related to the date and the table is automatically tied to the user's on-line reservation. The user only needs to select a start time of the replay clip base on the time stamp and a desirable duration of the replay clip and press a button to order the replay clip.

Figure 6:
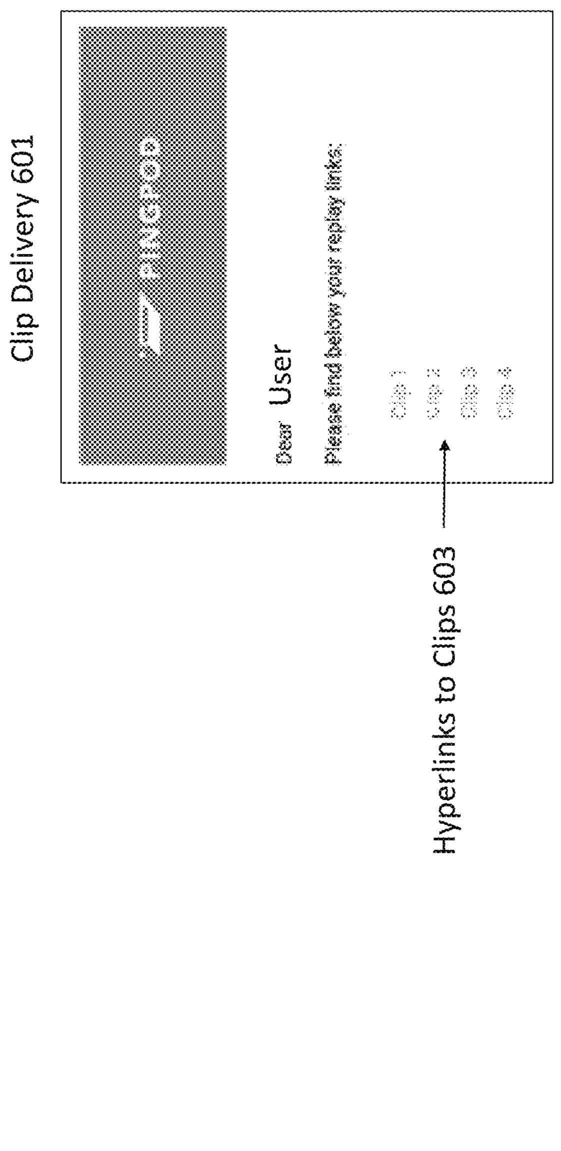
FIG. 6 is schematic view depicting an exemplary notification to the user for choose deliverable video clips.

FIG. 6 depicts an example clip message 601 delivered to the user 101 (as an example) by the clip delivery module 134. The sending of a clip message 601 is one method that the clip delivery module 134 can use to deliver a clip to the user 101. The depicted example clip message 601 includes hyperlinks to clips 603. The user can click on the hyperlinks 603 to access clips that are stored on a network. In other embodiments, a clip message 601 can be displayed to the user 101 via the user interface 150.

Figure 7:
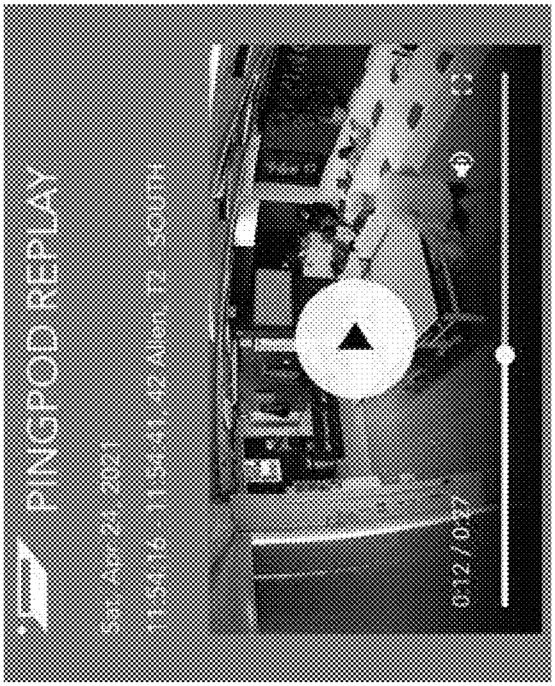
FIG. 7 is schematic view depicting an exemplary video clip delivered to the user by the system shown in FIG. 1.

FIG. 7 depicts an example clip display 701 that includes the clip 703 as a streamed video. The clip display 701 may also include optional mechanisms for the user 101 to download the clip and may also include optional mechanisms for the user 101 to further send or share the clip across other networks. For example, the clip display 701 can include links for a user 101 to share a clip via social media or email to another email address. The clip display can be included in the user interface 150 or may be delivered to the user 101 separately via email or via a different user interface.

Figure 8:
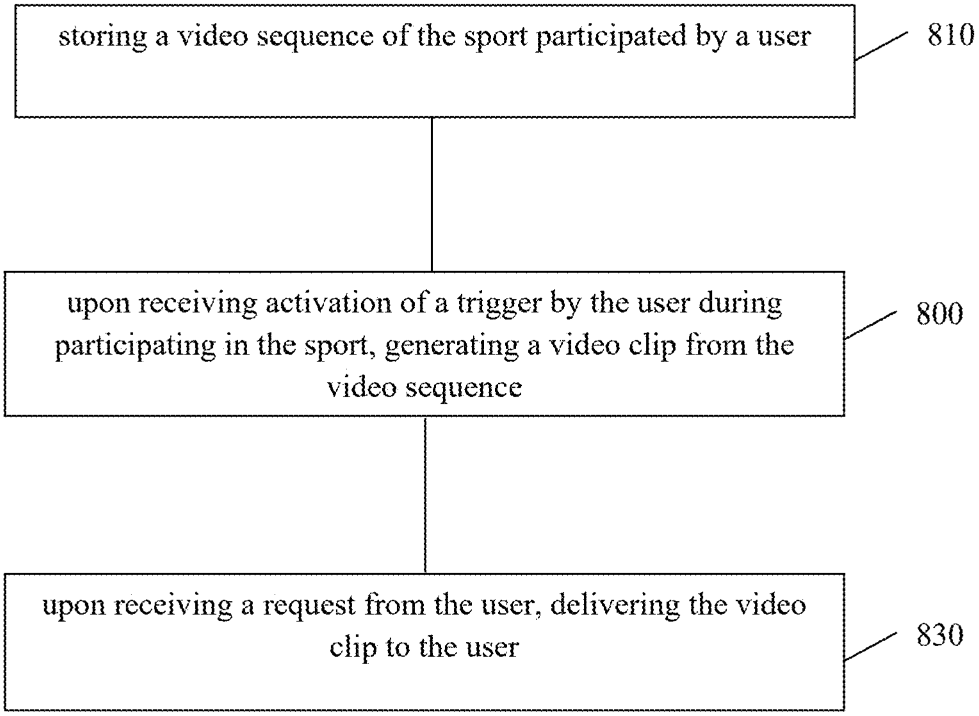
FIG. 8 is a flow chart depicting a method for generating and delivering video clips of a sport to a user participating in the sport, according to yet another aspect of the disclosure.
Figure 12:
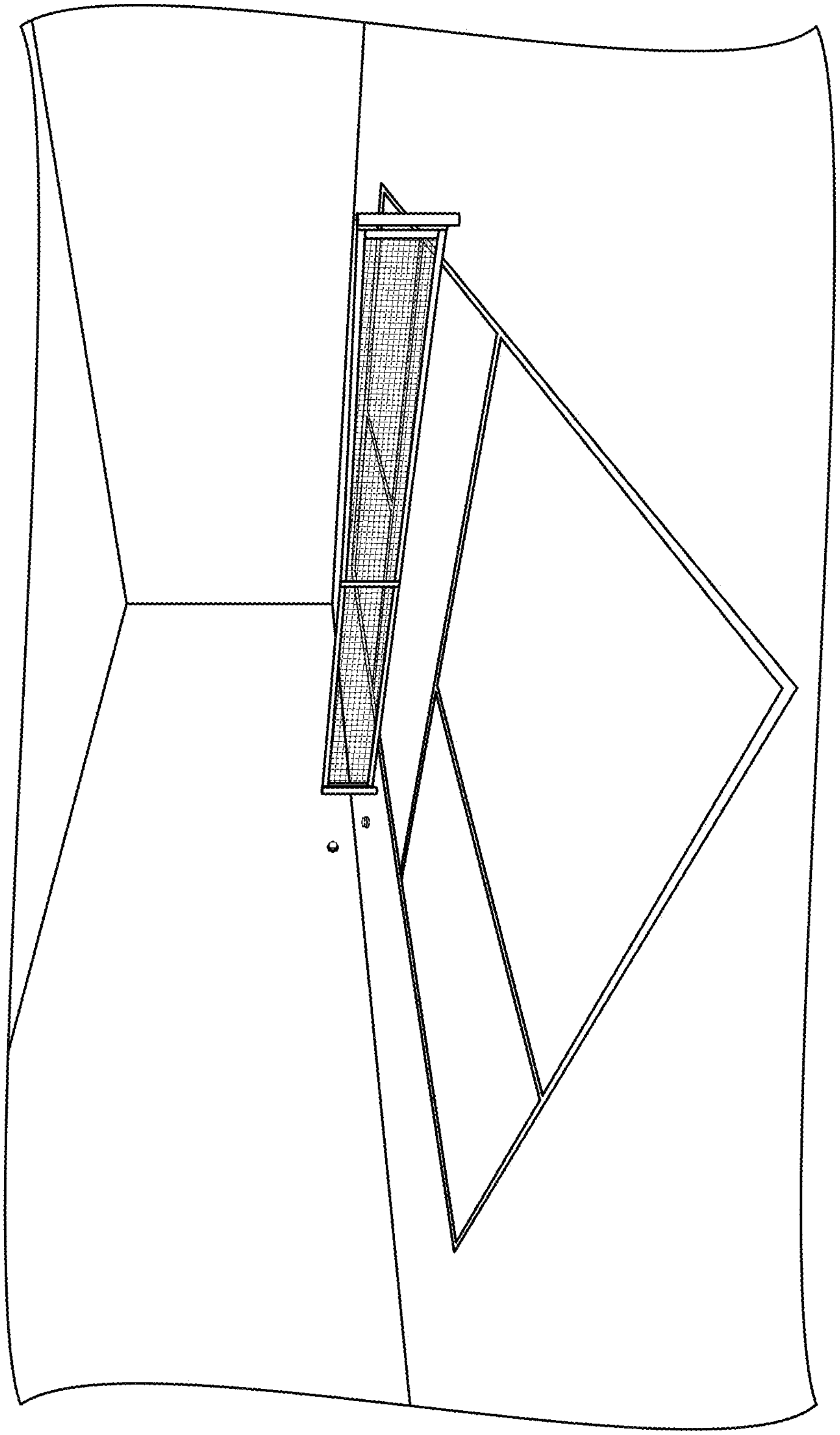
FIG. 12 is a schematic view depicting a system for generating and delivering video clips of a sport to a user participating in the sport, according to still another embodiment of the disclosure.

FIG. 8 is a flow chart depicting a method 800 for generating and delivering video clips of a sport to a user participating in the sport, according to yet another aspect of the disclosure. At step 810, a video sequence of the sport participated by the user is stored in a network or a memory. At step 820, upon receiving activation of a trigger by the user during participating in the sport, a video clip is generated based on the video sequence. The video clip has a clip duration determined based on a timing for activating the trigger. The video clip includes at least a part of the video sequence. At step 830, upon receiving a request, the video clip is delivered to the user. The trigger includes a button in proximity to the user, such that the user can activate the button during participating in the sport. The sport can be a racket sport (including table tennis, badminton, squash, tennis, pickleball, Padel tennis, and so on), a tabletop sport (including billiards and so on), dancing in a studio, and so on. FIG. 12 schematically illustrates a court for a racket sport, such as, tennis and pickleball, in which the above-discussed embodiments and implements are applicable. For example, the button can be on the floor of the court or a wall surrounding the court.

Figure 9:
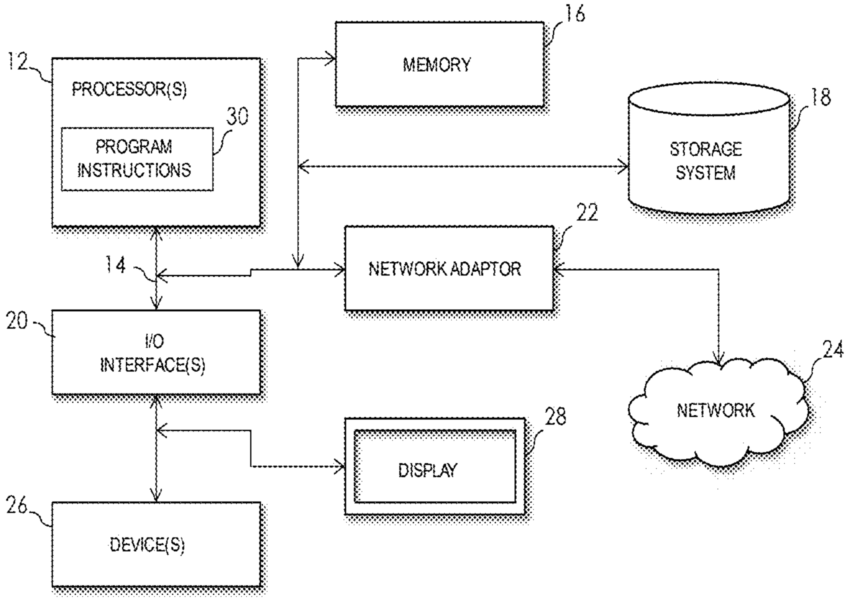
FIG. 9 is a schematic view showing an exemplary computer or processing system that can implement the method shown in FIG. 8.

FIG. 9 is a schematic view showing an exemplary computer or processing system that can implement the method shown in FIG. 8.

The computer system is only one example of a suitable processing system and is not intended to suggest any limitation as to the scope of use or functionality of embodiments of the methodology described herein. The processing system shown may be operational with numerous other general-purpose or special-purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more hardware processors 12, a system memory 16, and a bus 14 that couples various system components including system memory 16 to processor 12. The processor 12 may include a module 30 that performs the methods described herein. The module 30 may be programmed into the integrated circuits of the processor 12, or loaded from system memory 16, storage device 18, or network 24 or combinations thereof. The processors 12 can include the processor 400 as described previously. Alternatively, the processor 400 can be independent from the processors 12.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage device 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to, microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Another aspect of the disclosure provides a computer program product for delivering video clips of a sport to at least one user participating in the sport. The computer program product includes a computer readable storage medium having program instructions embodied therewith. The program instructions are executable by a processing element of a device to cause the device to:

store a video sequence of the sport participated by the at least one user;

upon receiving activation of a trigger by the at least one user during participating in the sport, generate a video clip from the video sequence, wherein: the video clip has a clip duration determined based on a timing for activating the trigger, and the clip includes at least a part of the video sequence; and upon receiving a request, deliver the video clip to the at least one user.

The trigger is provided in proximity to the at least one user, such that the at least one user can activate the trigger during participating in the sport.

By using the method and system of the disclosure as described above, a sport participant (such as, a table tennis player) can readily select and share video clips on the user's social media, which can be highlights of funny, cool or show-off rallies. These video clips are generated by activating the triggers. As used herein terms such as "a", "an" and "the" are not intended to refer to only a singular entity, but include the general class of which a specific example may be used for illustration.

As used herein, terms defined in the singular are intended to include those terms defined in the plural and vice versa.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. A system for delivering video clips of a racket sport to at least one user participating in the racket sport, the system comprising:

a recording device configured to generate a video sequence of the racket sport participated by the at least one user, wherein the video sequence comprises at least one rally performed by the at least one user;

a hardware processor configured to:

generate a video clip upon activation of a trigger by the at least one user after the at least one rally during participating in the racket sport, wherein the video clip comprises at least a part of the video sequence comprising the at least one rally and has a clip duration determined based on a timing of the activation of the trigger, and deliver the video clip to the at least one user upon receiving a request; and the trigger being provided in proximity to the at least one user, such that the at least one user can activate the trigger after the at least one rally during participating the racket sport, wherein the trigger comprises: a voice activated sensor, wherein the activation of the trigger is implemented by a voice of the at least one user, or a motion activated sensor, wherein the activation of the trigger is implemented by a motion of the at least one user, and wherein the racket sport participated by the at least one user comprises pickleball, the at least one rally comprises at least one pickleball rally, and the trigger is in proximity to the court of the pickleball.

2. The system of claim 1, wherein the clip duration has a length in the range of five seconds to five minutes.

3. A method for delivering video clips of a racket sport to at least one user participating in the racket sport, the method comprising:

storing a video sequence of the racket sport participated by the at least one user, wherein the video sequence comprises at least one rally performed by the at least one user;

upon receiving activation of a trigger by the at least one user after the at least one rally during participating in the racket sport, generating a video clip based on the video sequence, wherein:

the video clip has a clip duration determined based on a timing for activating the trigger, and the video clip comprises at least a part of the video sequence comprising the at least one rally; and upon receiving a request, delivering the video clip to the at least one user, wherein the trigger being provided in proximity to the at least one user, such that the at least one user can activate the trigger after the at least one rally during participating in the racket sport, wherein the trigger comprises: a voice activated sensor, wherein the activation of the trigger is implemented by a voice of the at least one user, or a motion activated sensor, wherein the activation of the trigger is implemented by a motion of the at least one user, and wherein the racket sport participated by the at least one user comprises pickleball, the at least one rally comprises at least one pickleball rally, and the trigger is in proximity to the court of the pickleball.

4. The method of claim 3, wherein the clip duration has a length in the range of five seconds to five minutes.

5. A system for delivering video clips of a racket sport to at least one user participating in the racket sport, the system comprising:

a hardware processor; and a memory coupled with the hardware processor, wherein the hardware processor is configured at least to:

store a video sequence of the racket sport participated by the at least one user, wherein the video sequence comprises at least one rally performed by the at least one user;

upon receiving activation of a trigger by the at least one user after the at least one rally during participating in the racket sport, generate a video clip based on the video sequence, wherein:

the video clip has a clip duration determined based on a timing for activating the trigger, and the clip comprises at least a part of the video sequence comprising the at least one rally; and upon receiving a request, deliver the video clip to the at least one user, wherein the trigger is provided in proximity to the at least one user, such that the at least one user can activate the trigger after the at least one rally during participating in the racket sport, wherein the trigger comprises: a voice activated sensor, wherein the activation of the trigger is implemented by a voice of the at least one user, or a motion activated sensor, wherein the activation of the trigger is implemented by a motion of the at least one user, and wherein the racket sport participated by the at least one user comprises pickleball, the at least one rally comprises at least one pickleball rally, and the trigger is in proximity to the court of the pickleball.

6. The system of claim 5, wherein the clip duration has a length in the range of five seconds to five minutes.

7. A computer program product for delivering video clips of a racket sport to at least one user participating in the racket sport, the computer program product comprising a computer readable storage medium having program instructions embodied therewith, the program instructions executable by a processing element of a device to cause the device to:

store a video sequence of the racket sport participated by the at least one user, wherein the video sequence comprises at least one rally performed by the at least one user;

upon receiving activation of a trigger by the at least one user after the at least one rally during participating in the racket sport, generate a video clip based on the video sequence, wherein:

the video clip has a clip duration determined based on a timing for activating the trigger, and the clip comprises at least a part of the video sequence comprising the at least one rally; and upon receiving a request, deliver the video clip to the at least one user, wherein the trigger is provided in proximity to the at least one user, such that the at least one user can activate the trigger after the at least one rally during participating in the racket sport, wherein the trigger comprises: a voice activated sensor, wherein the activation of the trigger is implemented by a voice of the at least one user, or a motion activated sensor, wherein the activation of the trigger is implemented by a motion of the at least one user, and wherein the racket sport participated by the at least one user comprises pickleball, the at least one rally comprises at least one pickleball rally, and the trigger is in proximity to the court of the pickleball.

8. The computer program product of claim 7, wherein the clip duration has a length in the range of five seconds to five minutes.

* * * * *